(12) United States Patent
Liu et al.

(10) Patent No.: US 7,295,851 B2
(45) Date of Patent: Nov. 13, 2007

(54) METHODS FOR SETTING UP DISPATCH CALLS

(75) Inventors: Xinhua Liu, Lake in the Hills, IL (US); Kulbir S. Bagri, Barrington, IL (US); Yonghao Lin, Lake in the Hills, IL (US); Peter M. Drozt, Prairie Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 189 days.

(21) Appl. No.: 11/027,184

(22) Filed: Dec. 30, 2004

(65) Prior Publication Data

US 2006/0148505 A1    Jul. 6, 2006

(51) Int. Cl.
*H04Q 7/28*  (2006.01)
(52) U.S. Cl. .................. 455/517; 455/520; 455/512
(58) Field of Classification Search ............... 455/512, 455/507, 517, 521
See application file for complete search history.

(56) References Cited

U.S. PATENT DOCUMENTS

| 6,484,037 B1 * | 11/2002 | Schmidt et al. ......... 455/518 X |
| 6,564,261 B1 * | 5/2003 | Gudjonsson et al. ... 370/261 X |
| 2003/0017836 A1 * | 1/2003 | Vishwanathan et al. .... 455/517 |

* cited by examiner

*Primary Examiner*—Philip J. Sobutka

(57) ABSTRACT

In the present technique, a dispatch call setup determines (508) whether an auto-reply as a response to a polite dispatch call request is available. If so, a dispatch call blocked using the available auto-reply is sent (512) as a response to the polite dispatch call request. In response to an impolite dispatch call request being received (504, 506), a determination (528) occurs regarding whether an impolite request is allowed, and if not, the impolite dispatch call request is rejected (522). Otherwise, a dispatch call page is sent (534) to indicate the impolite dispatch call request.

19 Claims, 8 Drawing Sheets

METHODS FOR SETTING UP DISPATCH CALLS

TECHNICAL FIELD

This invention relates generally to methods for setting up dispatch calls over a communication network.

BACKGROUND

Dispatch calls generally use a forced-audio model where the target mobile station does not have to answer the call in order for the call to be set up. In other words, unlike traditional telephone systems, a dispatch call is set up at the time when the originator mobile station makes the call, assuming that the target mobile station is active. As a result, this can be extremely disruptive and intrusive for the user of the target mobile station, because the target mobile station automatically accepts the call without confirmation from the user. Some users try to work around this limitation by following a protocol that can be less intrusive. For example, the user of the originator mobile station may initiate a dispatch call with the user of the target mobile station without speaking, which may result in a "chirp" on the target mobile station. When the user of the target mobile station hears this "chirp," the user can choose to either respond and engage in a conversation or send a "chirp" back to indicate that the user is currently busy and unable to talk. This behavior, however, is not enforced by either the mobile stations or the infrastructure and does not provide any reasons why the user of the target mobile station is unavailable. As a result, this may cause the user of the originator mobile station unnecessary frustration. Similarly, this can also be frustrating for the user of the target mobile station since there is no mechanism to prevent the user of the originator mobile station from speaking when the call is initially requested. Essentially, the users of a dispatch mobile station have very little control over their mobile station under such circumstances.

BRIEF DESCRIPTION OF THE DRAWINGS

The above needs are at least partially met through provision of the dispatch call setup processes described in the following detailed description, particularly when studied in conjunction with the drawings, wherein.

Figure 1:
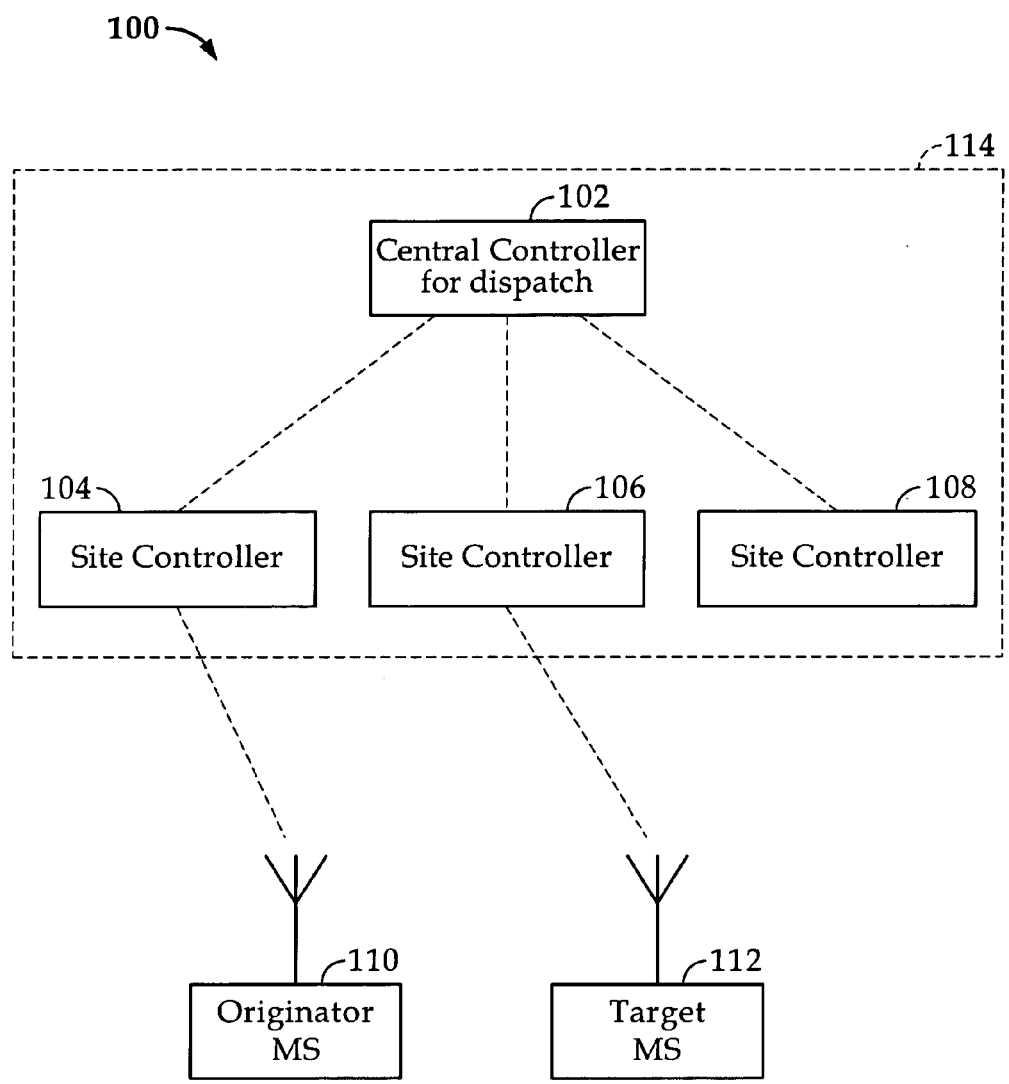
FIG. 1 comprises a block diagram of a typical wireless dispatch communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a polite dispatch call setup process has been provided that determines whether an auto-reply is available as a response to a polite dispatch call request, and if so, a dispatch call blocked using the available auto-reply is sent as a response to the polite dispatch call request. If, on the other hand, the auto-reply is not available, a dispatch call is set up in one particular embodiment. Furthermore, in one embodiment, when an auto-reply is unavailable, the polite dispatch call request is rejected if no response from the target mobile station has been received. In another embodiment, information relating to the polite dispatch call request is stored to make a record of the dispatch call request. In one embodiment, it is determined whether the auto-reply is stored in a network controller, and if so, the auto-reply is obtained from the network controller. Otherwise, a dispatch call page is sent to indicate the polite dispatch call request. In another embodiment, it is determined whether a response to the dispatch call page has been received from the target mobile station, and if not, the polite dispatch call request is rejected. In one specific embodiment, it is further determined whether the auto-reply is included with the response if it has been received. In order to setup the auto-reply, the user is prompted to enter the auto-reply, and if the auto-reply is a recurring event, the user is further prompted to enter a recurring time for the event. In another embodiment, the user is prompted to select a location to store the auto-reply. Accordingly, the auto-reply is stored either locally or at the network controller as indicated by the user.

In various embodiments, an impolite dispatch call setup process has been provided that determines whether an impolite request is allowed responsive to an impolite dispatch call request being received. The impolite dispatch call request would be rejected if it is not allowed. If an impolite dispatch call request is allowed, a dispatch call page to indicate the impolite dispatch call request is then sent. In one embodiment, it is further determined whether there is a requirement of a first attempt of a polite dispatch call request, and if so, another determination is made as to whether a previous attempt has in fact been received. If not, the impolite dispatch call request is rejected. If there has been a first attempt, however, the dispatch call page is again sent in response.

In various embodiments, a process to initiate a dispatch call has been provided that, responsive to receipt of a request to initiate a dispatch call and information relating to a target user of the dispatch call, a dispatch call request that is characterized by a politeness level is sent. In one embodiment, the politeness level includes both an impolite dispatch call and a polite dispatch call. Also, in another embodiment, it is determined whether the dispatch call is defined by a default politeness level, and if so, the default politeness level is selected. Otherwise, a politeness level is received from a selection by the user. Specifically, in one embodiment, the user is prompted to select a politeness level, and an error message is sent when the user fails to select the politeness level. Responsive to a dispatch call page that is defined with a politeness level, it is determined whether the dispatch call page is defined as a polite request politeness level, and if so, an auto-reply is sent in response to the dispatch call page. The dispatch call page, otherwise, is accepted when the dispatch call page is impolite. In another embodiment, the dispatch call page is also accepted when an auto-reply is not available.

According to various embodiments, a novel dispatch call setup process has been provided that allows for multiple pre-defined auto-replies customized by the user. Moreover, according to various teachings, dispatch calls are divided into polite and impolite calls which the user can leverage to customize automatically accepting or rejecting the specific dispatch calls. As a result, the users can now control their availability schedules, recurring events, interruption allowance, and/or customized auto-reply. The user of the originator mobile station will be able to obtain more information for a rejected dispatch call, while the user of the target mobile station will not be interrupted without permission. In various embodiments, since the user can select an interruption during an unavailable schedule, the user can properly address urgent dispatch calls that must be attended to. As a result, a more user friendly and flexible dispatch call setup process has been provided through the various teachings described.

Referring now to the drawings, and in particular to FIG. 1, for purposes of providing an illustrative but non-exhaustive example to facilitate this description, a specific operational paradigm using a wireless dispatch communication system is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described are not platform dependent, they can be applied to various systems, such as, but not limited to, Code Division Multiple Access (CDMA) systems, Time Division Multiple Access (TDMA) systems, Universal Mobile Telecommunications Systems ("UMTSs"), iDEN system, wireless local area network systems (e.g., 802.11), Orthogonal frequency-division multiplexing (OFDM) based systems, and General Packet Radio Service ("GPRS") systems. In fact, any communication networks that include the feature of dispatch or push-to-talk calling are contemplated and are within the scope of the invention.

Referring now to the exemplary communication network shown in FIG. 1, a central controller 102 is operably coupled to multiple site controllers 104, 106, 108. The site controllers 104, 106, 108 provide services to multiple mobile stations ("MSs") 110, 112 (two shown). Since current cell phones have many similar functions to that of computer devices, a mobile station will be herein used to refer to any device that can transmit data packets, which includes, but is not limited to, cell phones, personal digital assistants, and/or computers. In this example, MS 110 is an originator MS that is trying to communicate with MS 112, which would be referred to as the target MS. In other words, the originator MS 110 will initiate a dispatch call setup with the target MS 112, which may result in a dispatch call being setup between the two MSs. Specifically, the originator MS 110 sends a dispatch call request to the site controller 104, and the target MS 112, for example, responds to the site controller 106 to start the communication. Of course, in various embodiments, a response is not needed from the target MS 112. In this case, the central controller 102 will accordingly route the appropriate response to the originator MS 110 via the site controller 104. The central controller 102 along with the site controllers 104, 106, 108 will herein be referred to as a network controller 114 to emphasize the various teachings described can be partially and/or fully implemented in either the central controller 102 and/or the serving site controllers 104, 106, 108. The communication system 100 shown is a typical exemplary structure of a dispatch call network for an originator MS and a target MS shown.

Figure 2:
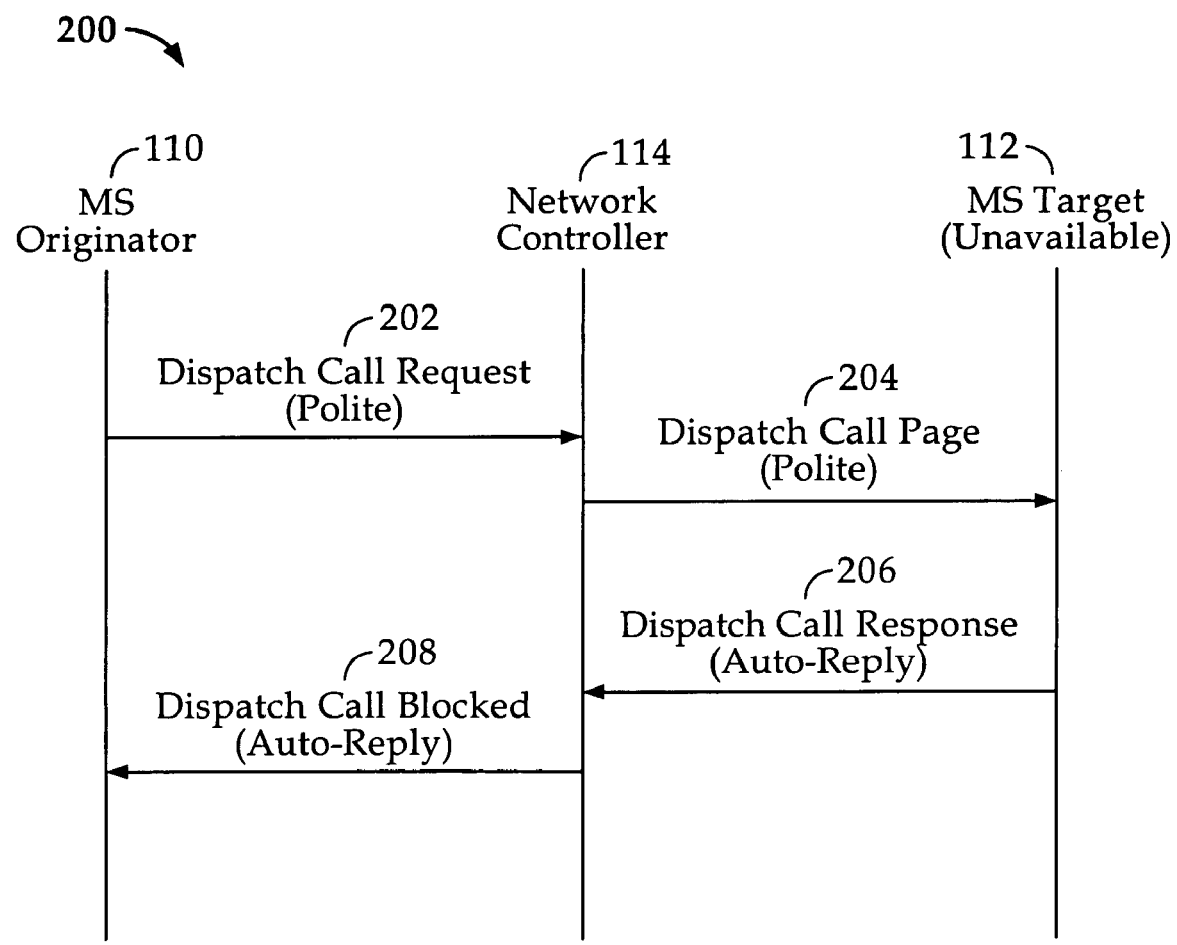
FIG. 2 comprises a call flow diagram of a polite dispatch call setup according to an embodiment of the invention implemented at the mobile station.

Turning now to FIG. 2, a call flow diagram 200 of a polite dispatch call setup process according to an embodiment implemented on a mobile station is shown and indicated generally at 200. In this particular call flow diagram shown, because the MS is modified to process the dispatch calls, modification of the network controller 114 may not be required to accommodate the various teachings described. Other implementations, such as processing the dispatch calls on the network controller 114, are also available, and these alternative implementations are within the scope of the various teachings described. Moreover, in the various embodiments, a distinction of a polite and an impolite call is imposed upon the dispatch call. A polite call refers to a dispatch call that can be blocked with a response of an auto-reply, whereas an impolite call refers to a dispatch call that attempts to override the call blocked of the auto-reply. For example, the originator MS 110 submits a polite dispatch call request to the target MS 112, and in response, the originator MS 110 receives an auto-reply that indicates that the target MS is unavailable. This, however, is unacceptable to the user of the originator MS 110 for many possible reasons, such as an emergency, and the originator MS can then send an impolite dispatch call request to interrupt the target MS 112, assuming that the target MS is set in a mode that allows impolite dispatch calls. This is the general distinction between the polite and impolite dispatch call requests.

In this particular example, a polite dispatch call request is sent 202 from the originator MS 110 to the target MS 112 via the network controller 114 that actually forwards 204 the request to the target MS. Assuming that the target MS 112 is currently in the unavailable mode, the target MS will automatically send 206 an auto-reply as a response to the polite dispatch call request to the network controller 114, which forwards 208 the auto-reply to the originator MS 110. This auto-reply can be customized by the user in multiple ways, such as according to a recurring event or specific to a scheduled event. Note that the user of the target MS 112 was not interrupted at all by the polite dispatch call request. Furthermore, since the auto-reply can be customized to include more details that may be more specific to the current event, such as "I am in a meeting, please call me back at 3:00 p.m." In this case, the user of the originator MS 110 can make a proper decision as whether to interrupt based on the information given. As a result, the user of the target MS 112 is not interrupted unnecessarily, while the user of the originator MS 110 would avoid unnecessary frustrations.

Figure 3:
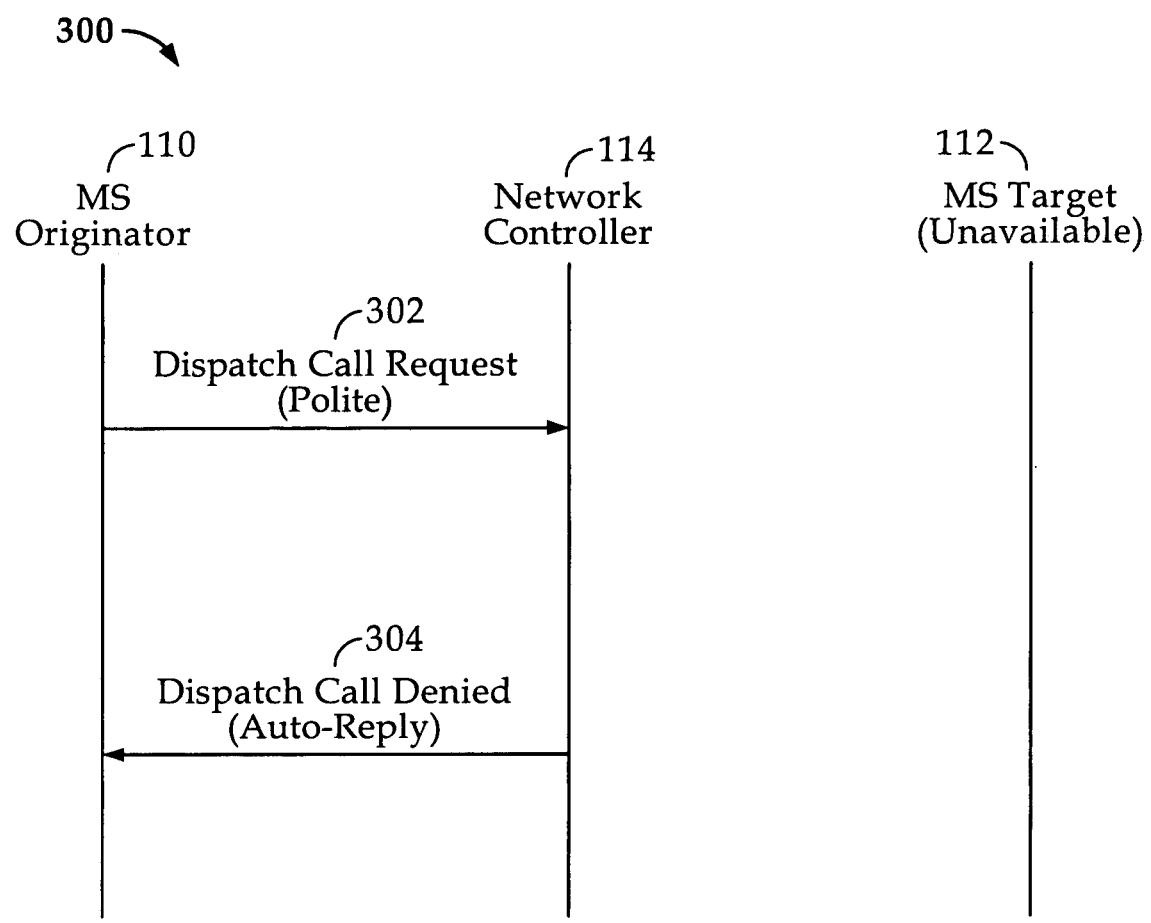
FIG. 3 comprises a call flow diagram of a polite dispatch call setup according to an embodiment of the invention implemented at the network controller.

Referring to FIG. 3, a call flow diagram of a polite dispatch call setup according to an embodiment implemented at the network controller is shown and indicated generally at 300. In this embodiment shown, since the network controller 114 is adapted with the various embodiments described, the target MS 112 is not alerted of a polite dispatch call request if the user previously saved an auto-reply to the network controller. In fact, if the user previously set up the target MS to disallow impolite dispatch calls during this unavailable time, the user of the target MS will not be disrupted at all. As shown, responsive to a polite dispatch call request 302 from the originator 110, the network controller 114 sends 304 a dispatch call denied attached with an auto-reply that was either previously provided by the user or a default auto-reply provided by the network controller. In this example, if the user of the originator MS decided to send an impolite dispatch call, the network controller 114 will accordingly respond based on customization set previously by the user.

Figure 4:
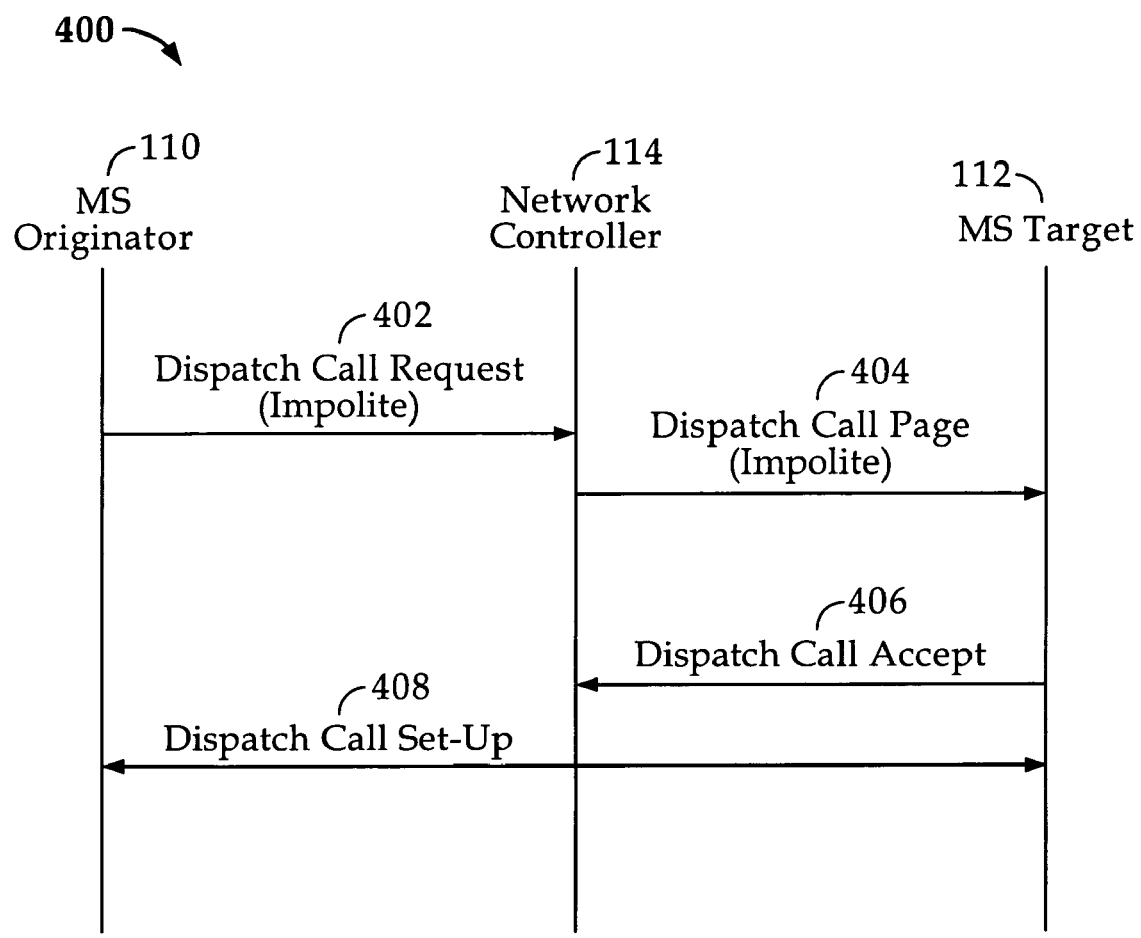
FIG. 4 comprises a call flow diagram of a impolite dispatch call setup according to an embodiment of the invention.

In FIG. 4, an example of an impolite call flow is shown and indicated generally at 400. The call flow 400 starts with the originator MS sending 402 an impolite dispatch call request to initiate an impolite dispatch call to the target MS. The customization of whether an impolite is allowed is set previously by the user, which can either be stored at the network controller 114 or at the target MS. In either embodiment, this customization will be looked up to determine whether the impolite dispatch call is allowed. If not, the user of the target MS is not alerted of the impolite dispatch call page.

If the impolite dispatched call request is allowed, as shown, the network controller 114 accordingly forwards 404 an impolite dispatch call page to the target MS, which would alert the user of an impolite call. In the embodiment where the customization is stored in the target MS 112, the network controller, nevertheless, sends the impolite dispatch call page to the target MS 112. The difference is, however, that the target MS would look up the customization set by the user and may or may not alert the user of the impolite call, depending upon the customizations previously defined by the user. In this example shown, an impolite call is allowed, and the user of the target MS 112 responds 406 with a dispatch call accept to the network controller 114. As a result, a dispatch call between the originator MS 110 and the target MS 112 is now set up 408 with the dispatch call accept from the target MS.

Figure 5:
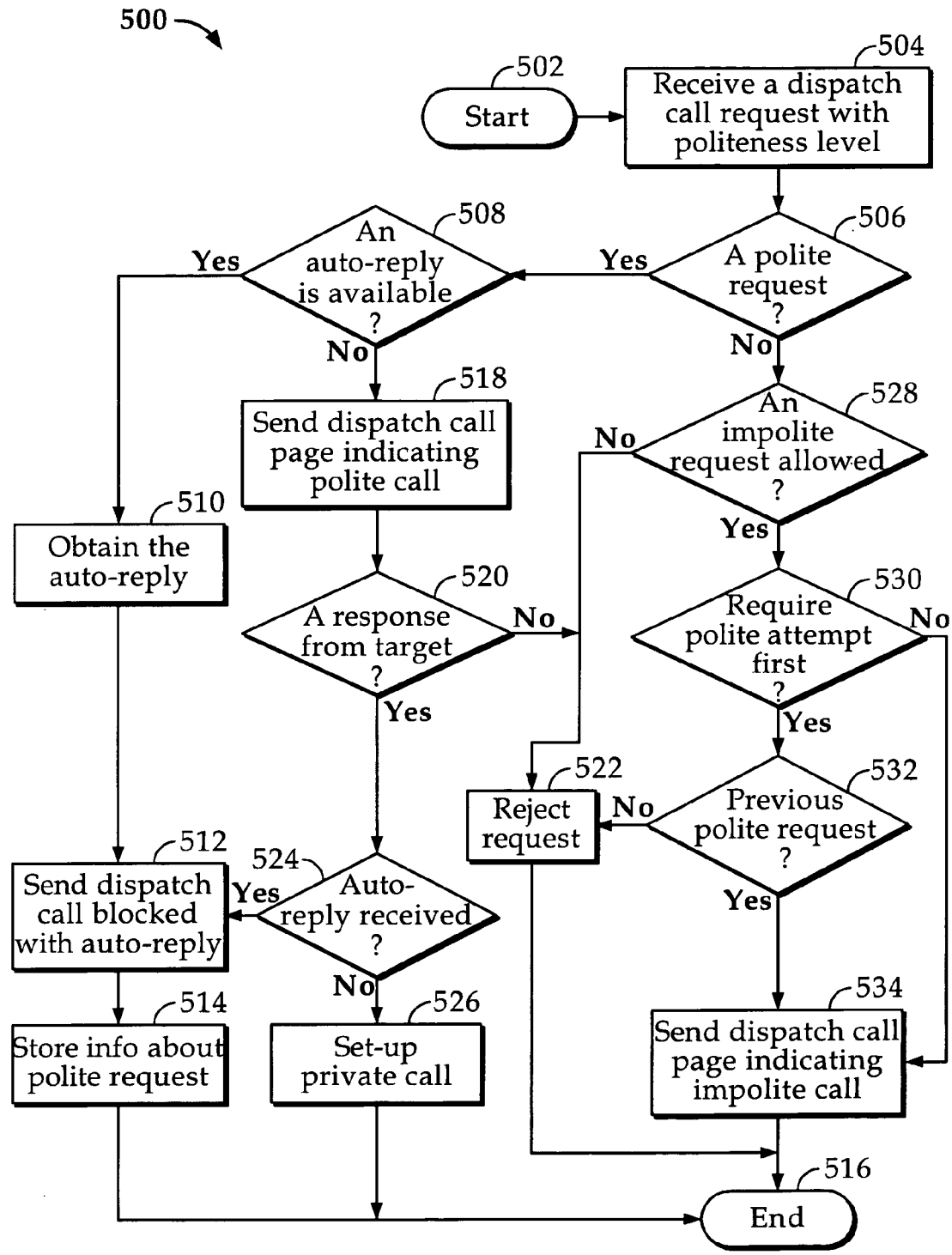
FIG. 5 comprises a flow chart diagram of a dispatch call request process according to an embodiment of the invention.

Referring now to FIG. 5, a flow chart diagram of a dispatch call setup process according to an embodiment of the invention is shown and indicated generally at 500. These processes, as shown, can be implemented fully or partially at either the target MS 112 or network controller 114. Moreover, as one skilled in the art can readily appreciate, any of the processes shown can be altered in multiple ways to achieve the same functions and results of the various teachings described. As a result, these processes shown are one exemplary embodiment of multiple-variation embodiments that may not be specifically shown. These other embodiments, however, are within the scope of the various teachings described.

In light of this, this particular process shown assumes that the target MS is currently in the unavailable mode. This process 500 begins 502 with a dispatch call request identified with a politeness level being received 504 from the originator MS. Responsive to this request, the process determines 506 whether this is a polite or an impolite dispatch call request. If this is a polite dispatch call request, it is next determined 508 whether an auto-reply is available. If so, the auto-reply is accordingly obtained 510, and a dispatch call blocked with the auto-reply is sent 512 to the originator MS. Information relating to the polite dispatch call request is stored 514 to make a record of the call, which ends 516 the process until another dispatch call request is received.

If, on the other hand, an auto-reply is not available in the system, a dispatch call page is sent 518 to the user of the target MS as an indication of the polite dispatch call request. It is then determined 520 whether a response has been, in fact, received from the target MS. If not, the dispatch call request is rejected 522. If, on the other hand, the user of the target responds to the dispatch call page, it is next determined 524 whether the response is an auto-reply. If the response is an auto-reply, which results in the auto-reply being available, the process accordingly reloops to send the dispatch call blocked along with the auto-reply to the user of the originator MS. If the response is not an auto-reply from the target MS, meaning that a dispatch call accept has been received, the process accordingly sets up 526 the dispatch call between the originator MS and the target MS, which again brings the process to an end 516. This also ends the subroutine of a process of receiving a polite dispatch call request.

In the case when an impolite dispatch call request has been received, the process determines 528 whether an impolite request is allowed during this unavailable time based on previous customization defined by the user of the target MS. If not, the dispatch call request is automatically rejected 522. If, on the other hand, an impolite request is allowed, the process determines 530 whether the user of the target MS has previously set a first attempt requirement of a polite request. If so, it is determined 532 whether a polite request has been previously attempted. Recall earlier that information relating to the polite request was stored to make a record of the polite request. The process accordingly looks up that stored information to determine 532 whether there is a first attempt of a polite request. If not, the dispatch call request is again rejected 522. If, however, either there is no requirement of a first attempt and/or there has been a first attempt, a dispatch call page is sent to the target MS to indicate the impolite dispatch call request to the user.

Figure 6:
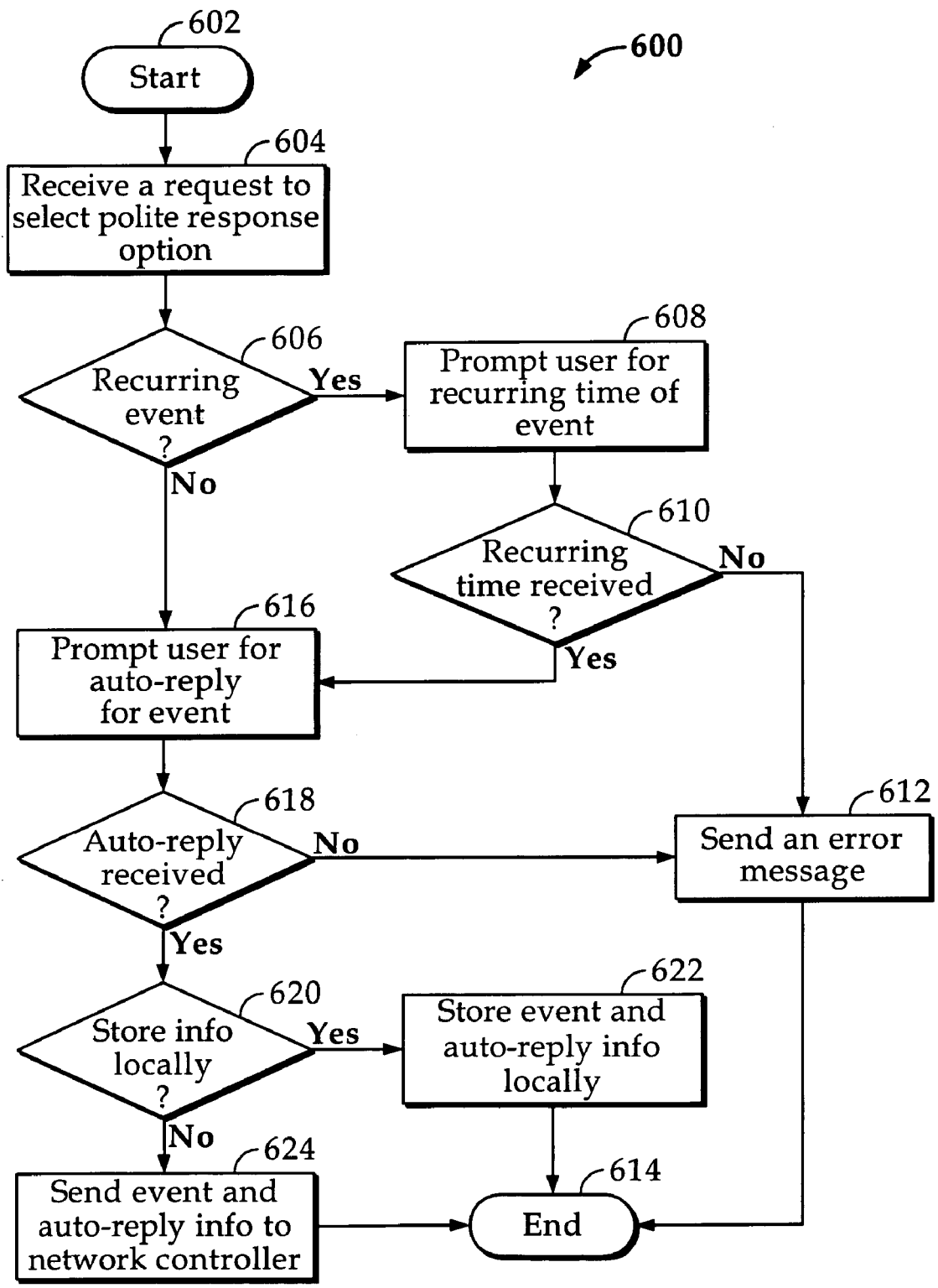
FIG. 6 comprises a flow chart diagram of an auto-reply setup process according to an embodiment of the invention.

Turning now to FIG. 6, a flow chart diagram of an auto-reply setup process according to an embodiment of the invention is shown and indicated generally at 600. This process is initiated 602 by receiving 604 a request to select a polite response option, and in response, this process determines 606 whether the request is a recurring event. If so, the user is prompted 608 to enter or select the recurring time of event, followed by a determination 610 of whether such recurring time has in fact been received from the user. If no such recurring time has been received, an error message is sent 612 to the user, and this process ends 614 at this time. If, on the other hand, a recurring time has been received as expected from the user, the process next prompts 616 the user for an auto-reply for the event, which has been either selected as a recurring event or an event without a recurring time. The process again determines 618 whether the auto-reply has been received, and if not, an error message is also sent 612 to end 614 the process. If, however, the auto-reply has been received by the process, it is next determined 620 whether the auto-reply should be stored locally. If so, the event and the auto-reply associated with the event are stored 622 locally, or otherwise, they are sent 624 to the network controller, and this brings the process to the end 614.

Although, as shown, the user chooses the location where the auto-reply should be stored, other alternative embodiments are contemplated. For example, the storage location of the auto-replies may be previously defined by the system, and as such, the user does not necessarily have any control over where they are stored. Moreover, different implementations result in different benefits that may be more suitable for a particular implementation. As another example, if the auto-replies are stored at the infrastructure, the amount of messages that need to be sent over-the-air is limited, which is beneficial to the use of bandwidth. On the other hand, if the auto-replies are stored at the mobile station, it can receive an indication that a call was attempted, which can be stored in a history log that the user can refer to at a later time. Because these other various embodiments are readily appreciated by one skilled in the art, they are within the scope of the various teachings described.

Figure 7:
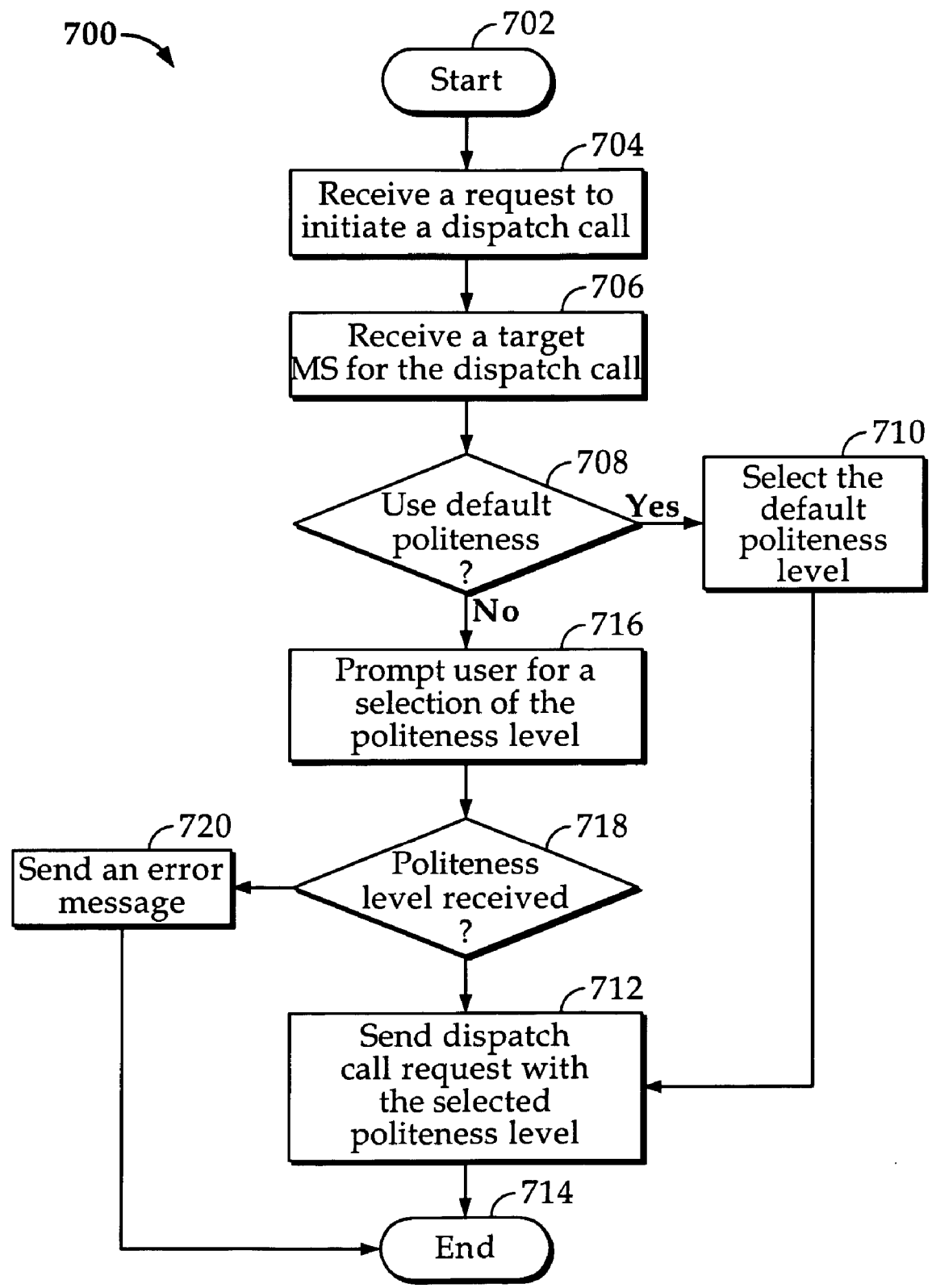
FIG. 7 comprises a flow chart diagram of a dispatch call setup process according to an embodiment of the invention.

Turning now to FIG. 7, a flow chart diagram of a dispatch call setup process according to an embodiment of the invention is shown and indicated generally at 700. The process begins 702 with a user selecting to initiate a dispatch call, which results in the process to receive 704 a request to initiate the dispatch call. The user next selects a target MS for the dispatch call, which again results in the process to receive 706 the selected target MS. It is next determined 708 whether a default politeness level should be used for the dispatch call, which could be either a default value the user assigned to the particular target mobile station or a general default value to be used for any target mobile station. If so, the default politeness level is selected 710 and a dispatch call request with the selected politeness level is sent 712 to the network controller, which brings the process to an end 714.

If, on the other hand, the default politeness should not be used, the user is prompted 716 for a selection of the politeness level to be used for this dispatch call. The process determines 718 whether a politeness level has been received, and if not, an error message is sent 720 to the user. If, however, the politeness level has been received, the dispatch call request along with the selected politeness level are sent 712, and the process concludes 714 at this point.

Figure 8:
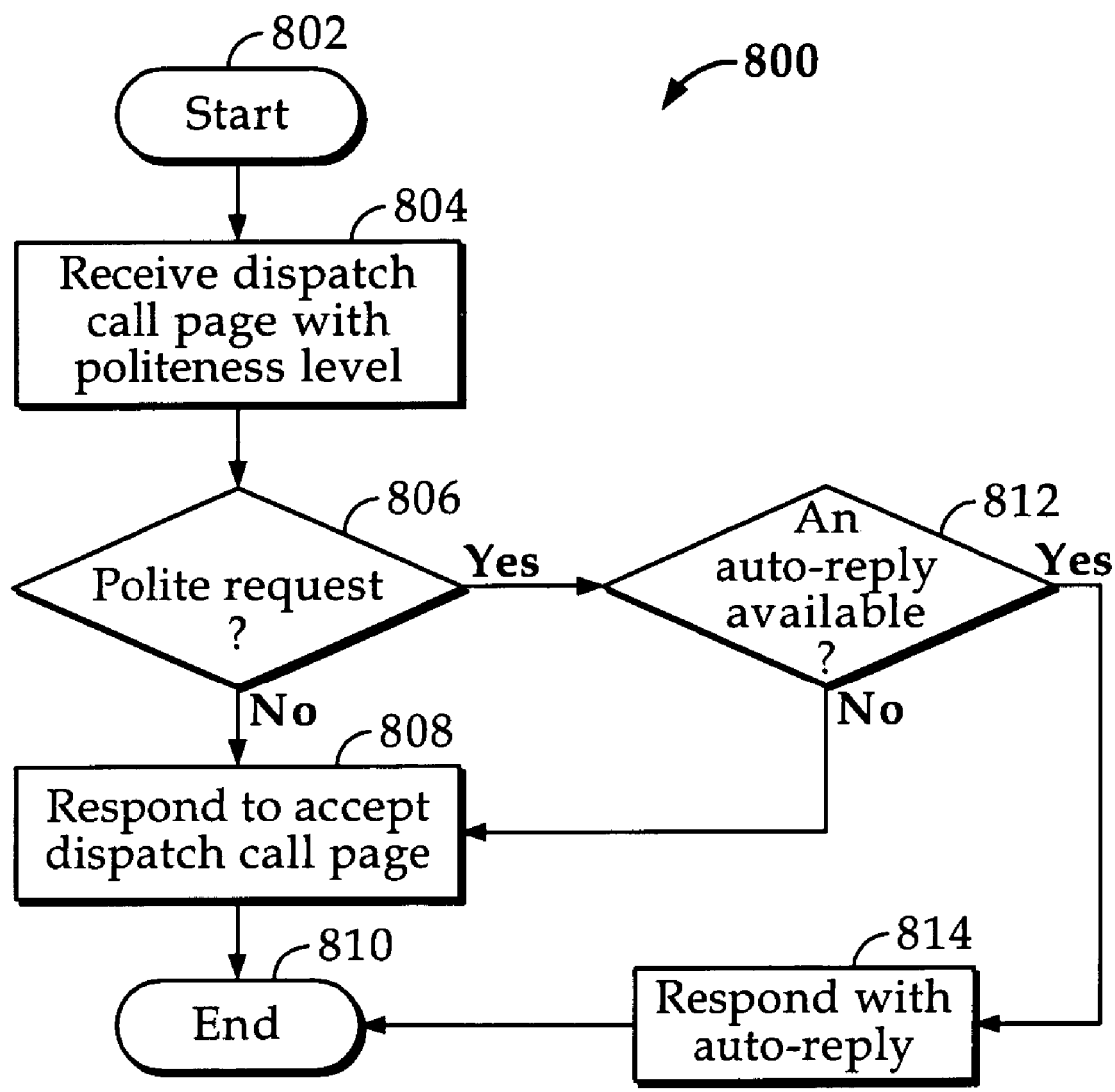
FIG. 8 comprises a flow chart diagram of a respond dispatch call page process implemented on the network controller according to an embodiment of the invention.

Turning now to FIG. 8, a flow chart diagram of a respond dispatch call page process according to an embodiment of the invention is shown and indicated generally at 800. The process is initiated 802 with a receipt 804 of a dispatch call page indicated with a politeness level. In response, the process determines 806 whether the dispatch call page is a polite request. If the dispatch call page is not a polite request, the process responds 808 to accept the dispatch call page, which ends 810 the process. If, however, this is a polite request, it is determined 812 whether an auto-reply is available. If an auto-reply is not available, the process again responds 808 to accept this dispatch call page. If, on the other hand, an auto-reply is available, the process responds 814 with the available auto-reply, which ends 810 the process.

With these various teachings shown, a technique of a dispatch call setup has been provided. As a result of various teachings shown, users are now allowed to customize multiple pre-defined auto-replies. Moreover, according to various embodiments, dispatch calls are divided into polite and impolite calls, which can automatically accept or reject the dispatch call requests. As a result, users can control their availability schedules, recurring events, interruption allowance, and/or customized auto-replies to accept or reject a dispatch call request. The user of the target MS will be able to send more information when the dispatch call request has been rejected, which reduces the frustration experienced by the users of the originator MS. At the same time, because the user of the target MS will not be interrupted without permission, the dispatch call experience would be less disruptive since more customization options are now available to the user. In various embodiments, since the user can select an interruption during an unavailable schedule, the user can properly address urgent dispatch calls that must be attended to. As a result, a more user friendly and flexible dispatch call setup process has been provided through the various teachings described.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of responding to dispatch call request having a polite/impolite attribute, the method comprising:
   receiving a dispatch call request having a polite/impolite attribute;
   determining whether there is an auto-reply available as a response to the dispatch call request having a polite/impolite attribute;
   blocking the dispatch call request having a polite attribute when the auto-reply is available; and
   sending a dispatch call blocked using the auto-reply responsive to the dispatch call request having a polite attribute when the auto-reply is available.

2. The method according to claim 1 further comprising:
   setting up a dispatch call responsive to the dispatch call request when the auto-reply is not available.

3. The method according to claim 1 further comprising:
   storing information to make a record of the dispatch call request.

4. The method according to claim 1, wherein determining whether there is an auto-reply available as a response to the dispatch call request having a polite/impolite attribute further comprises:
   determining whether the auto-reply is stored in a network controller;
   obtaining the auto-reply from the network controller when the auto-reply is stored in the network controller;
   sending a dispatch call page to indicate the dispatch call request when the auto-reply is not stored in the network controller.

5. The method according to claim 4, wherein determining whether there is an auto-reply available as a response to the dispatch call request having a polite attribute further comprises:
   determining whether a response to the dispatch call page has been received;
   rejecting the dispatch call request when a response to the dispatch call page has not been received.

6. The method according to claim 5, wherein determining whether there is an auto-reply available as a response to the dispatch call request further comprises:
   determining whether the auto-reply is included with the response to the dispatch call page when a response to the dispatch call page has been received.

7. The method according to claim 1 further comprising: prompting a user to enter the auto-reply.

8. The method according to claim 1, wherein the auto-reply is defined as a recurring event and further comprises:
   prompting a user to enter a recurring time for the recurring event.

9. The method according to claim 1 further comprising:
   prompting a user to select a location to store the auto-reply;
   storing the auto-reply locally when a user response is received to store the auto-reply locally;
   sending the auto-reply to a network controller when a user response is received to store the auto-reply at the network controller.

10. A method of responding to dispatch call request having an impolite attribute, the method comprising:
   receiving a dispatch call request having an impolite attribute;
   determining whether a request having an impolite attribute is allowed;
   rejecting the dispatch call request having an impolite attribute when a request having an impolite attribute is not allowed;
   sending a dispatch call page to indicate the dispatch call request having an impolite attribute when a request having an impolite attribute is allowed.

11. The method according to claim 10 wherein rejecting the dispatch call request having an impolite attribute further comprises:
   determining whether there is a requirement of a first attempt of a dispatch call request having a polite attribute;
   determining whether there has been a previous attempt of a dispatch call request having a polite attribute when there is a requirement of a first attempt of a dispatch call request having a polite attribute;
   rejecting the dispatch call request having an impolite attribute when there has not been a previous attempt of a dispatch call request having a polite attribute.

12. The method according to claim 10, wherein sending a dispatch call page further comprises:
   determining whether there is a requirement of a first attempt of a dispatch call request having a polite attribute;
   sending the dispatch call page when there is no requirement of a first attempt of a dispatch call request having a polite attribute.

13. The method according to claim 10, wherein sending a dispatch call page further comprises:
   determining whether there is a requirement of a first attempt of a dispatch call request having a polite attribute;
   determining whether there has been a previous attempt of a dispatch call request having a polite attribute when there is a requirement of a first attempt of a dispatch call request having a polite attribute;
   sending the dispatch call page to indicate the call having an impolite attribute when there has been a previous attempt of a dispatch call request having a polite attribute.

14. A method of initiating a dispatch call comprising:
   receiving a request to initiate a dispatch call;
   receiving information relating to a target user of the dispatch call;
   sending a dispatch call request characterized by a politeness level;
   receiving an auto-reply based on the politeness level in the dispatch call request, and
   changing the politeness level in the dispatch call request and resending the dispatch call request.

15. The method according to claim 14, wherein the politeness level is any one selected from a group of an impolite dispatch call and a polite dispatch call.

16. The method according to claim 14, wherein sending a dispatch call request defined by a politeness level further comprises:
   determining whether the dispatch call is defined by a default politeness level;
   selecting the default politeness level when the dispatch call is defined by a default politeness level;
   selecting a received politeness level when the dispatch call is not defined by a default politeness level.

17. The method according to claim 16, wherein selecting a received politeness level further comprises:
   prompting a user to select a politeness level;
   determining whether a politeness level has been received;
   sending an error message when a politeness level has not been received;
   selecting the received politeness level when a politeness level has been received.

18. The method according to claim 14 further comprising:
   receiving a dispatch call page defined with a politeness level;
   determining whether the dispatch call page is defined as a polite request politeness level;
   responding with an auto-reply when the dispatch call page is defined as a polite request politeness level;
   responding to accept the dispatch call page when the dispatch call page is not defined as a polite request politeness level.

19. The method according to claim 18, wherein responding to accept the dispatch call page further comprises:
   determining whether an auto-reply is available;
   responding to accept the dispatch call page when an auto-reply is not available.

* * * * *